(12) United States Patent
Gouin

(10) Patent No.: US 6,211,846 B1
(45) Date of Patent: Apr. 3, 2001

(54) ANTENNA SYSTEM FOR RADIO DIRECTION-FINDING

(75) Inventor: Jean-Pierre Gouin, Santeny (FR)

(73) Assignee: Societe Technique d'Application et de Recherche Electronique, Starec (FR)

( * ) Notice: Subject to any disclaimer, the term of this patent is extended or adjusted under 35 U.S.C. 154(b) by 0 days.

(21) Appl. No.: 09/320,300

(22) Filed: May 26, 1999

(30) Foreign Application Priority Data

May 26, 1998 (FR) .................................................. 98-06590

(51) Int. Cl.⁷ ........................................................ H01Q 1/12
(52) U.S. Cl. .......................... 343/891; 343/726; 343/793
(58) Field of Search .................................. 343/725, 726, 343/729, 730, 890, 891, 793, 794, 709; H01Q 1/12

(56) References Cited

U.S. PATENT DOCUMENTS

| 3,093,827 | * | 6/1963 | Travers | 343/114 |
| 3,611,389 | * | 10/1971 | Coors et al. | 343/726 |
| 3,665,479 | * | 5/1972 | Silliman | 343/726 |
| 3,721,990 | * | 3/1973 | Gibson et al. | 343/726 |
| 4,207,572 | | 6/1980 | Hipp et al. | 343/113 R |
| 4,916,454 | | 4/1990 | Bull et al. | 342/373 |
| 5,264,862 | | 11/1993 | Kumpfbeck | 343/853 |
| 5,300,885 | * | 4/1994 | Bull | 324/247 |
| 5,521,608 | | 5/1996 | Brandt et al. | 343/749 |

FOREIGN PATENT DOCUMENTS

| 3619028 | 12/1987 | (DE) . |
| 2576152 | 7/1986 | (FR) . |

OTHER PUBLICATIONS

Patent abstracts of Japan; vol. 008, No. 059 May 17, 1984.

* cited by examiner

*Primary Examiner*—Don Wong
*Assistant Examiner*—Shih-Chao Chen
(74) *Attorney, Agent, or Firm*—Blakely Sokoloff Taylor & Zafman

(57) ABSTRACT

A radio direction-finding system with at least two loop antennas, generating a reference signal, wherein the radio direction finding system has more than one dipole distributed around, and parallel to the mast which sum the signals output by the various dipoles, the resulting sum signal being used as the reference signal.

9 Claims, 1 Drawing Sheet

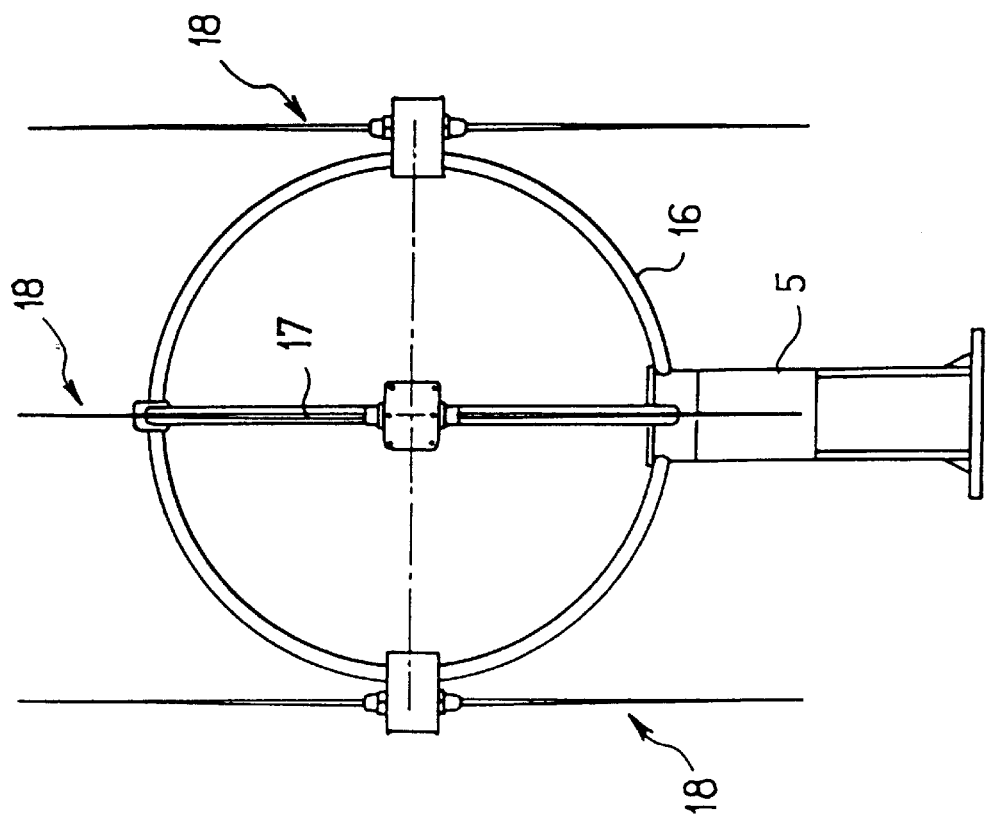
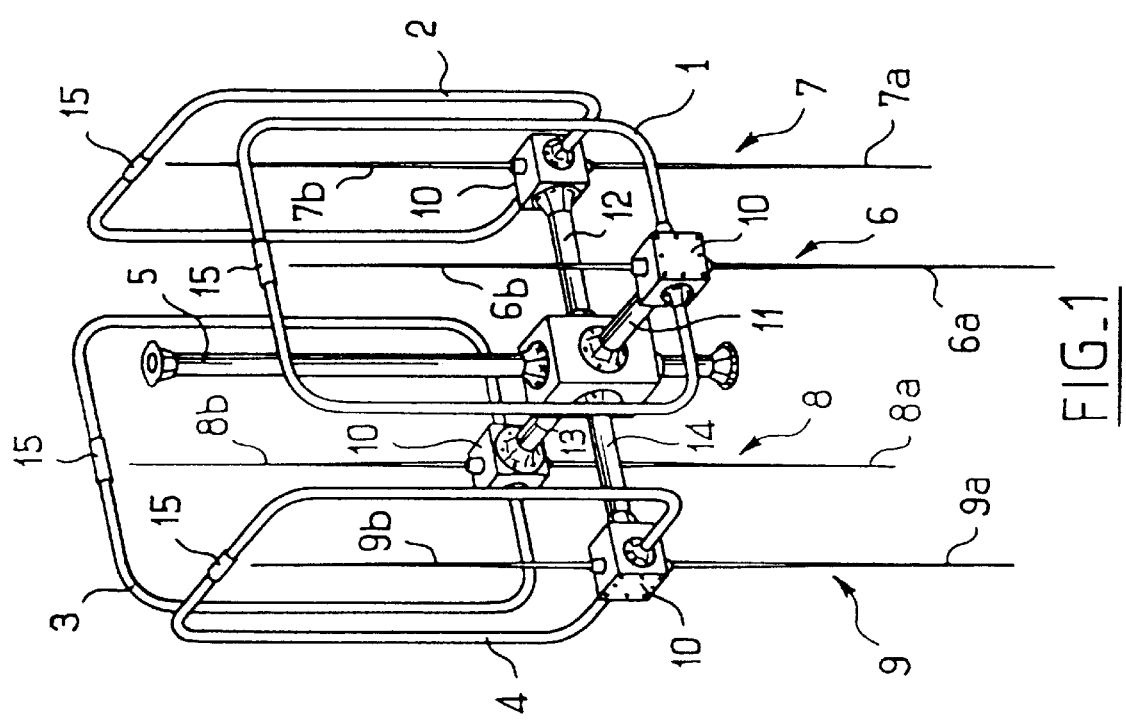

ANTENNA SYSTEM FOR RADIO DIRECTION-FINDING

The present invention relates to antenna M for radio direction-finding as installed on ast, e.g. the mast of a ship.

BACKGROUND OF THE INVENTION

The systems conventionally used in amplitude radio direction-finding (DF) are systems having crossed loops or systems having parallel loops distributed around the mast, where the latter systems present the advantage over crossed loop systems of making it possible to obtain considerable improvements in terms of the amount of error associated with readings, particularly when the direction of incidence of the electromagnetic wave to be measured coincides with the axis of the ship. As a general rule, crossed loop systems and parallel loop systems include an omnidirectional reference antenna which is a dipole antenna carried by the mast, which extends along the axis said mast, extending it upwards.

The accuracy of such DF systems is very highly affected in the high frequency (HF) range by reflections on obstacles placed in the vicinity of the antennas, and particularly when the system is used on board a ship, by reflections from the superstructure of the ship, its masts and its transmitter antennas.

OBJECTS AND SUMMARY OF THE INVENTION

An object of the invention is to propose a loop type antenna system in which the means which are used for generating the reference signal are decoupled from the mast so that the currents induced in the mast are not transmitted to said reference signal, and in which said means are also completely decoupled from the loop antennas, so that the reference signal is entirely independent of the measurement signals.

The solution of the invention is a system comprising at least two loop antennas and means for generating a reference signal, wherein said means comprise a plurality of dipoles distributed around the mast and parallel thereto, and means for summing the signals output by the various dipoles, the resulting sum signal being used as the reference signal.

The system is advantageously associated with the following characteristics taken singly or in any technically feasible combination:

the dipoles are carried by the loop antennas;

the system comprises a plurality of loop antennas, and the dipoles extend in the planes of said loop antennas;

the system comprises four loop antennas distributed around the mast and parallel in pairs, together with four dipoles which extend parallel to the mast, on the axes of symmetry of said loop antennas;

each of said dipoles is constituted by two segments extending symmetrically rom a midpoint at the bottom of the associated loop;

the loops are tubular elements within which there extends a loop of wire, each of said loops having a gap in its top portion;

the loop antennas and the dipoles are connected to the mast via tubular arms to which said loop antennas and the dipoles are fixed, and cables extend along said arms and the mast to connect the outputs of said antennas to processing means;

the system comprises crossed loops each loop carries two dipoles which are diametrically opposite and which extend parallel to the axis of the mast, being fixed to said loops substantially halfway up them; and the HF antenna system is advantageously used on board a ship.

BRIEF DESCRIPTION OF THE DRAWING

Other aspects, objects, and advantages of the invention will appear more clearly on reading the following description of an embodiment of the invention, given by way of example and made with reference to the accompanying drawing, in which:

FIG. 1 is a perspective view of an antenna system constituting a possible embodiment of the invention; and FIG. 2 is a side view of an antenna system constituting another possible embodiment of the invention.

MORE DETAILED DESCRIPTION

The antenna system shown in FIG. 1 comprises four identical loop antennas 1 to 4 distributed uniformly around a mast 5, e.g. the mast of a ship.

The planes in which said antennas 1 to 4 extend are parallel to said mast 5, with the loops 1 and 3 being parallel to each other and with the loops 2 and 4 likewise being parallel to each other.

The two pairs of antennas defined by the loops 1 and 3 and by the loops 2 and 4 are thus in DF quadrature and present radiation patterns characterized by the following relationships:

$$E_{NS} = E_0 \sin \theta$$

$$E_{EW} = E_0 \cos \theta$$

where $\theta$ is the angle of incidence of the electromagnetic wave that is to be detected, measured relative to the antennas 1 and 3 which constitute the north-south antennas;

$E_0$ is the amplitude of the signal;

$E_{NS}$ is the electric field corresponding to the sum of the fields received by the north-south antennas 1 and 3; and $E_{EW}$ is the electric field which corresponds to the sum of the fields received by the east-west antennas 2 and 4.

The distance between the loops 1 and 3, or between the loops 2 and 4, is selected to be much smaller than the wavelengths corresponding to the frequency band which is to be observed.

Similarly, the dimensions of the loops 1 to 4 are selected to be small relative to said wavelengths.

In the example shown in FIG. 1, the loop antennas 1 to 4 are of the rectangular type. Naturally, they could be replaced by antennas of other shapes, and in particular by antennas in the form of circular loops.

The system also has four dipole antennas 6 to 9. Each dipole antenna 6 to 9 extends in the plane of one of the loop antennas 1 to 4, in a direction that is parallel to the mast 5, and that corresponds to an axis of symmetry for the corresponding loop antenna 1 to 4 in the plane of which said dipole antenna is located.

More particularly, each of said dipoles 6 to 9 is constituted by two segments extending symmetrically on either side of the midpoint at the bottom of the corresponding loop 1 to 4. Thus, each dipole 6 to 9 comprises a top segment which extends inside the loop 1 to 4 in whose plane said dipole is situated, and a bottom segment which extends downwards, outside said loop. The bottom segments are referenced 6a to 9a, and the top segments 6b to 9b.

The bottom and top segments of each dipole 6 to 9 are interconnected by a 0–180° balun.

The balun is disposed in a housing 10 which is fixed in the middle of the bottom arm of the loop 1 to 4 in which the dipole 6 to 9 associated with said balun is associated. The output from the balun is connected o an amplifier.

The housing 10 also receives an amplifier hose input is connected to the ends of the wire corresponding to the output from said loop 1 to 4.

The housings 10 also serve to fix the loops 1 to 4 and the dipoles 6 to 9 on tubular arms 11 to 14. These arms 11 to 14 extend between the mast 5 and said housings 10, perpendicularly to said mast 5.

The balun and the amplifiers received in each of said housings 10 are connected by cables which extend along the arms 11 to 14 and inside the mast 5 to processing means which enable the angle θ to be calculated as a function of the electrical signals received by the various antennas 1 to 4 and 6 to 9.

In particular, these processing means comprise a summing circuit for adding the four signals output by the dipoles 6 to 9.

They implement processing of the type that is conventionally known to the person skilled in the art using the signals output by the loop antennas 1 to 4 as measurement signals, and using the sum of the signals output by the dipoles 6 to 9 as a reference signal.

The sum signal is equivalent to the reference signal which is generally obtained using an omnidiectional antenna extending in line with the mast around which the loop antennas are distributed.

It will be observed here that using the above-described structure, the loops 1 to 4 and the dioles 6 to 9 are completely decoupled, given that she loops 1 to 4 behave like magnetic doublets, while the dipoles 6 to 9 behave like electric doublets. Consequently, the measurement antennas and the reference antenna are completely independent, thus making it possible to provide good DF operation.

Furthermore, given that the various antennas 1 to 4 and 6 to 9 are disposed around the mast 5, they are highly decoupled relative thereto.

To further reduce the risk of coupling, each of the antennas 1 to 4 is advantageously constituted by a metal tube which is shaped to have the shape of a loop within which there extends a wire loop, the loop having a gap in the middle of its top portion.

By way of example, this gap may be 1 cm to 2 cm long.

With such a disposition, the loop antennas 1 to 4 are grounded from above, such that said antennas 1 to 4 are decoupled from the feed to the output paths from the dipoles 6 to 9.

In the example shown in FIG. 1, the gaps in the loops 1 to 4 are covered by respective protective dielectric sleeves 15.

As an example of dimensions, the loop antennas i to 4 can be about 1.10 meters (m) high and about 60 cm wide. The distance between two facing loop antennas is about 1 m.

The height of the dipole antennas 6 to 9 is about 1.90 m.

Naturally, other dimensions are possible. In particular, the span of the array has very little influence on measurement accuracy providing the distance between two diametrically opposite loop antennas remains less than 0.2λ where λ is the wavelength of the signal that is to be detected.

Consequently, the system can easily be installed on a mast having a diameter of 20 cm, and also on a mast having a diameter of 80 cm, without requiring large installations.

Naturally, embodiments other than that described above can be envisaged.

In particular, the loops may be of the crossed type.

An embodiment of this kind is shown in FIG. 2.

In this embodiment, two circular-loop loops 16 and 17 cross each other perpendicularly.

These two crossed loops are mounted on the mast 5 via means fixed to said loops at the bottom portions thereof, with the axis of the mast 5 passing trough the center of each of the two loops 16, 17.

Each loop 16, 17 carries two dipoles 18 which are diametrically opposite and which extend parallel to the axis of the mast 5, being fixed to said loops 16, 17 substantially halfway up them.

What is claimed is:

1. A radio direction-finding comprising:
   at least two loop antennas on a mast, said antennas extending in planes parallel to said mast;
   a plurality of dipoles distributed around said mast and parallel thereto;
   first processing means for summing the signals output by the plurality of dipoles, the resulting sum signal being used as a reference signal for radio direction finding processing: and
   second processing means for performing a radio direction finding processing on the signals received by the various antennas.

2. The system of claim 1, wherein the dipoles are carried by the loop antennas.

3. The system of claim 1, comprising a plurality of loop antennas, and wherein the dipoles extend in the planes of said loop antennas.

4. The system of claim 1, comprising four loop antennas distributed around the mast and parallel in pairs, together with four dipoles which extend parallel to the mast, on the axes of symmetry of said loop antennas.

5. The system of claim 4, wherein each of said dipoles is constituted by two segments extending symmetrically from a midpoint at the bottom of the associated loop.

6. The system of claim 4, wherein the loops are loop tubular elements within which there extends a loop of wire, each of said loops having a gap in its top portion.

7. The system of claim 1, wherein the loop antennas and the dipoles are connected to the mast via tubular arms to which said loop antennas and the dipoles are fixed, and in which cables extend along said arms and the mast to connect the outputs of said antennas to processing means.

8. The system of claim 1, wherein said system comprises two antenna loops which extend perpendicular to each other in a crossed configuration, and wherein each loop carries two dipoles which are diametrically opposite on said loop and which extend parallel to the axis of the mast, said dipoles being fixed to said loops at approximately a mid point of each of said loops.

9. The system of claim 1, wherein said system is configured for attachment to the mast of a ship.

* * * * *